United States Patent
Buchko, Jr. et al.

(10) Patent No.: US 10,526,157 B2
(45) Date of Patent: Jan. 7, 2020

(54) WEB MATERIAL ADVANCEMENT ARRANGEMENT WITH AN ENTRY DRIVE SYSTEM IN A PACKAGING MACHINE

(71) Applicant: CP Packaging, Inc., Appleton, WI (US)

(72) Inventors: Raymond G. Buchko, Jr., Fremont, WI (US); Rodney W. Golla, New London, WI (US)

(73) Assignee: CP Packaging, Inc., Appleton, WI (US)

( * ) Notice: Subject to any disclaimer, the term of this patent is extended or adjusted under 35 U.S.C. 154(b) by 0 days.

(21) Appl. No.: 15/801,566

(22) Filed: Nov. 2, 2017

(65) Prior Publication Data
US 2018/0127226 A1 May 10, 2018

Related U.S. Application Data (60) Provisional application No. 62/417,577, filed on Nov. 4, 2016.

(51) Int. Cl.
*B65H 20/16* (2006.01)
*B65B 65/02* (2006.01)
(Continued)

(52) U.S. Cl.
CPC ............. *B65H 20/16* (2013.01); *B65B 65/02* (2013.01); *B65H 20/08* (2013.01);
(Continued)

(58) Field of Classification Search
CPC .... B65H 20/16; B65H 20/18; B65H 2404/34; B65H 2404/23; B65H 27/00; B65H 2403/40; B65H 2801/81
See application file for complete search history.

(56) References Cited

U.S. PATENT DOCUMENTS

| 4,336,680 A | 6/1982 | Grevich |
| 4,826,065 A | 5/1989 | Natterer |

(Continued)

FOREIGN PATENT DOCUMENTS

| DE | 10326727 | 8/2004 |
| EP | 0340360 | 11/1989 |
| EP | 2052979 | 4/2009 |

OTHER PUBLICATIONS

EP 1719998.6, Search Report dated Apr. 4, 2018, 9 pages.

*Primary Examiner* — Michael C McCullough
(74) *Attorney, Agent, or Firm* — Boyle Fredrickson, S.C.

(57) ABSTRACT

A web material advancement arrangement is provided with an entry drive system. The web material advancement arrangement can receive a web material from a storage roll and advance the web material through a machine, such as a packaging machine. The entry drive system may be arranged at the entry end of the web material advancement arrangement to push the web material in a downstream direction from the entry end toward the exit end of the web material advancement arrangement The entry drive system may include a motor that simultaneously rotates a pair of drive sprockets which may push clip assemblies that carry outer edges of a web material so that rotation of the drive sprockets pushes the web material in a downstream direction.

21 Claims, 9 Drawing Sheets

(51) Int. Cl.
  *B65H 20/08*   (2006.01)
  *F16G 13/02*   (2006.01)
  *F16H 7/02*   (2006.01)

(52) U.S. Cl.
  CPC .......... *B65H 2404/34* (2013.01); *F16G 13/02* (2013.01); *F16H 7/023* (2013.01)

(56) References Cited

U.S. PATENT DOCUMENTS

| | | |
|---|---|---|
| 4,915,283 A | 4/1990 | Buchko et al. |
| 4,944,442 A | 7/1990 | Buchko |
| 5,170,611 A | 12/1992 | Buchko et al. |
| 5,205,110 A | 4/1993 | Buchko |
| 5,443,150 A | 8/1995 | Buchko |
| 5,632,729 A | 11/1997 | Buchko |
| 7,293,683 B2 * | 11/2007 | Natterer .................. B65B 41/14 226/170 |
| 7,833,002 B2 | 11/2010 | Buchko et al. |
| 7,934,362 B2 | 5/2011 | Buchko et al. |
| 8,225,586 B2 | 7/2012 | Buchko et al. |
| 2005/0056720 A1 * | 3/2005 | Natterer .................. B65B 41/14 242/564.3 |

* cited by examiner

FIG. 9

WEB MATERIAL ADVANCEMENT ARRANGEMENT WITH AN ENTRY DRIVE SYSTEM IN A PACKAGING MACHINE

CROSS-REFERENCE TO RELATED APPLICATION

This application claims priority to U.S. Ser. No. 62/417,577 filed Nov. 4, 2016.

BACKGROUND

Web material advancement systems that feed web materials within product processing machines, such as packaging machines, are known. Web material advancement systems typically have exit drive systems that pull web material toward exit ends of the web material advancement systems to feed web processing stations downstream in the packaging machines. Such exit drive systems typically have a pair of independent servo motors or other drive units on both of the left and right sides of the exit end of the web material advancement systems. The servo motors are controlled to provide synchronous operation of both motors to ensure the web material does not skew as it is pulled from a downstream position to advance in the upstream-to-downstream direction. However, these independent paired-drive exit drive systems are complex and can require corresponding complex control methodologies for synchronization corrections in order to maintain coordinated driving of the left and right sides of the web material advancement systems. Other exit drive systems have incorporated a single drive shaft at the outlet end of the web advancement system that is positioned at a low elevation to provide package clearance. These separate-shaft exit drive systems have pairs of sprockets that are drive-coupled via chains to upper pairs of input sprockets to impart movement to a pair of gripper chains with web grippers. However, the independent chains of the chain-driven exit drive systems need maintenance and inspection and can stretch or otherwise wear at different rates, which can lead to skewed pulling of the web material toward the outlet end of the web advancement systems.

SUMMARY OF THE INVENTION

According to one aspect of the invention, a web material advancement arrangement is provided that has an entry drive system that is configured to push a web material from storage on a roll toward a web processing station of a packaging machine.

According to another aspect of the invention, a web material advancement arrangement with an entry drive system is provided. The web material advancement arrangement can receive a web material from a storage roll and advance the web material through a machine, such as a packaging machine. The web material advancement arrangement may include an entry end that receives the web material from storage on the roll and an exit end that delivers the web material from the web material advancement arrangement downstream toward the rest of the packaging machine. An entry drive system may be arranged at the entry end of the web material advancement arrangement and is configured to push the web material in a downstream direction from the entry end toward the exit end of the web material advancement arrangement.

According to another aspect of the invention, a pair of rotatable drive members is arranged at the entry end of the web advancement arrangement. The web advancement arrangement may define a pair of sides, and the pair of rotatable drive members may be arranged in rotational unison with each other at the respective sides. The pair of rotatable drive members may be defined by a pair of drive sprockets, and the entry drive system may drive the pair of drive sprockets as a unit. The pair of drive sprockets may be mounted to a drive roller at the entry end of the web material advancement arrangement. The drive roller may lock the pair of drive sprockets into rotational unison with each other.

According to another aspect of the invention, the drive roller defines a drive roller axis of rotation, and the motor includes a motor output shaft that defines a motor output shaft axis of rotation that is perpendicular to the drive roller axis rotation. A pair of spaced-apart rails 12 may extend between the entry end and exit end of the web material advancement arrangement to support the web material and wherein the motor is arranged generally parallel to the pair of spaced-apart rails.

According to another aspect of the invention, the input shaft may define an input shaft outer portion that receives power from the motor and an opposite input shaft inner portion. A first drive sprocket may be mounted to the input shaft inner portion to lock the first drive sprocket and the input shaft into rotational unison with each other. The drive roller may define first and second ends, with the first end mounted to the input shaft inner portion to lock the drive roller and the input shaft into rotational unison with each other. A support shaft may include a support shaft inner portion and a support shaft outer portion. The support shaft inner portion is mounted to the second end of the drive roller to lock support shaft and the drive roller in rotational unison with each other. A second drive sprocket is mounted to the support shaft inner portion to lock the second drive sprocket and the support shaft into rotational unison with each other. A power flow path may be defined that transfers torque (i) from the input shaft inner portion to the first drive sprocket and the first end of the drive roller, (ii) through the length of the drive roller, (iii) from the second end of the drive roller to the support shaft inner portion, and (iv) from the support shaft inner portion to the second drive sprocket.

According to another aspect of the invention, the entry drive system may include a motor, which may be the sole prime mover for the entry drive system, and a gearbox that receives power from the motor. The gearbox delivers power from the motor to the pair of sprockets and the roller to push the web material in a downstream direction from the entry end toward the exit end of the web material advancement arrangement. The gearbox may directly drive an input shaft that is mounted to the drive roller.

According to another aspect of the invention, a web material advancement arrangement is provided for advancing web material in a machine having an upstream end and a downstream end, such as a packaging machine, and which includes an entry drive system located at the upstream end of the machine. The web material advancement arrangement includes a web material engagement arrangement, which may be in the form of spaced-apart endless chains or belts equipped with web material gripper mechanisms that engage the web material adjacent opposite edges of the web material. The entry drive system includes a pair of rotatable drive members, such as pulleys or sprockets which are engaged with the web material engagement arrangement. A single motor includes a rotatable output member that is drivingly engaged with the rotatable drive members. Operation of the motor functions to impart rotation to the rotatable output member, which in turn causes simultaneous rotation of the rotatable drive members and advancement of the web material engagement arrangement and thereby advancement of the web material.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part. of this specification, wherein like reference numerals designate the same elements in the several views.

In the drawings.

DETAILED DESCRIPTION OF THE DRAWINGS

The present invention and the various features and advantageous details thereof are explained more fully with reference to the non-limiting embodiments described in detail in the following description.

Referring generally to the drawings, a portion(s) of a machine that utilizes web material, and that incorporates an entrance-end or entry drive system for advancing the web material according to an embodiment of the invention, is illustrated in FIGS. 1-9. Representatively, the machine may be a packaging machine in which web material is supplied from storage on a roll and advanced through the machine. During such advancement, components of the machine act on the web material to first deform the web material to create a series of upwardly facing cavities, which are then filled with product to be packaged. After placement of product into the cavities, the machine supplies a second, top web that overlies the bottom web within which the cavities are formed, Components of the machine then seal the top and bottom webs together about the cavities so as to seal product within each cavity. The sealed webs are then separated longitudinally and transversely to form individual product packages. A representative type of packaging machine within which the entrance-end or entry drive system, according to an embodiment of the invention, may be a form-fill-seal packaging machine such as is available from CP Packaging LLC of Appleton, Wis. under its designation VisionPak. It is understood, however, that the entrance-end or entry drive system according to an embodiment of the invention may be used in any type of packaging machine that utilizes web material within which product cavities are formed during advancement of the material through the machine. It is further understood that the entrance-end or entry drive system, according to an embodiment of the invention, may be used in applications other than packaging machines in which a flexible web material is supplied from a roll and advanced through the machine for any purpose.

Figure 1:
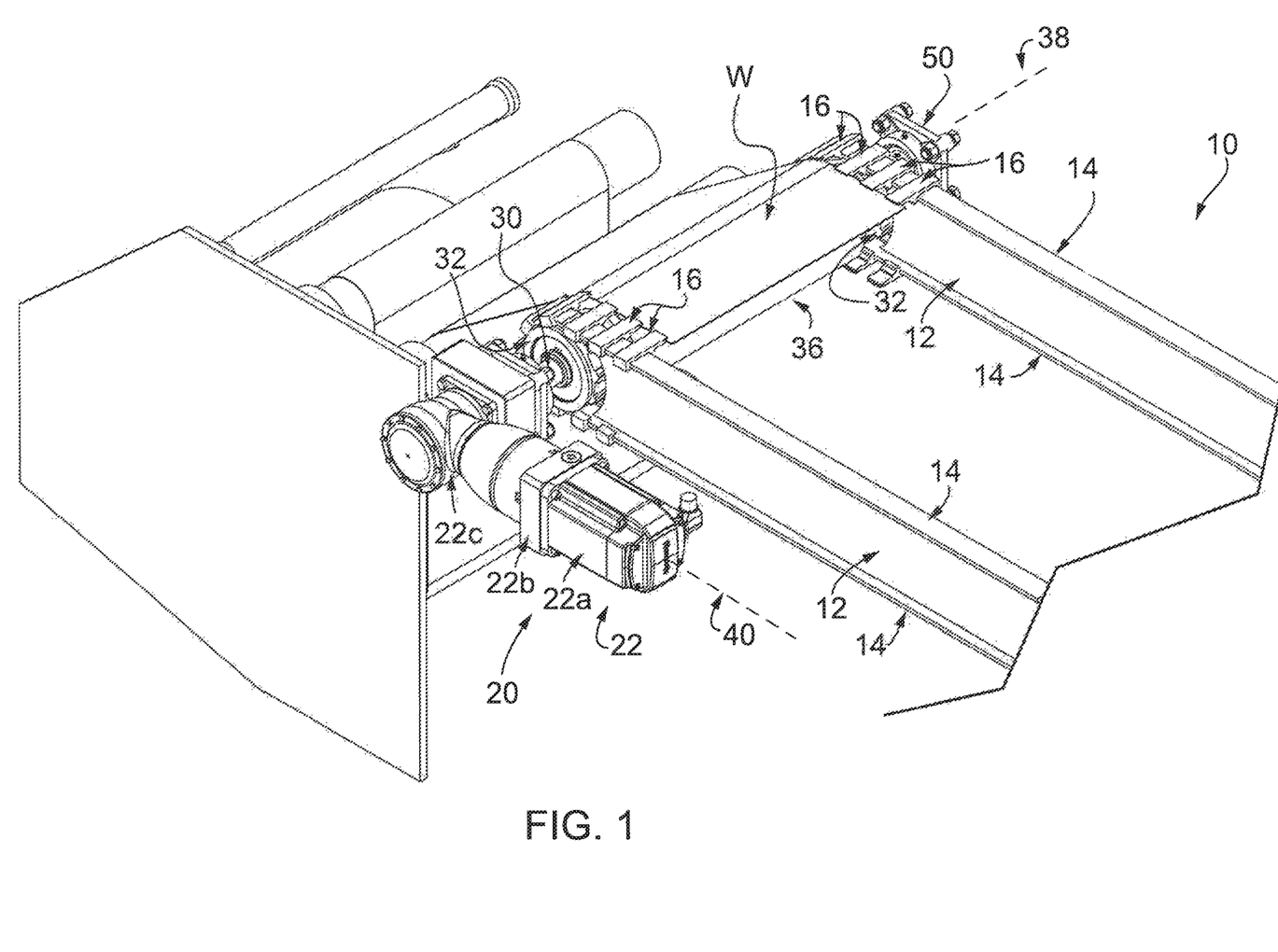
FIG. 1 is an isometric view of an upstream end portion of a machine, such as a packaging machine, incorporating a web material advancement arrangement with an entrance-end or entry drive system for advancing web material, according to an embodiment of the invention.
Figure 2:
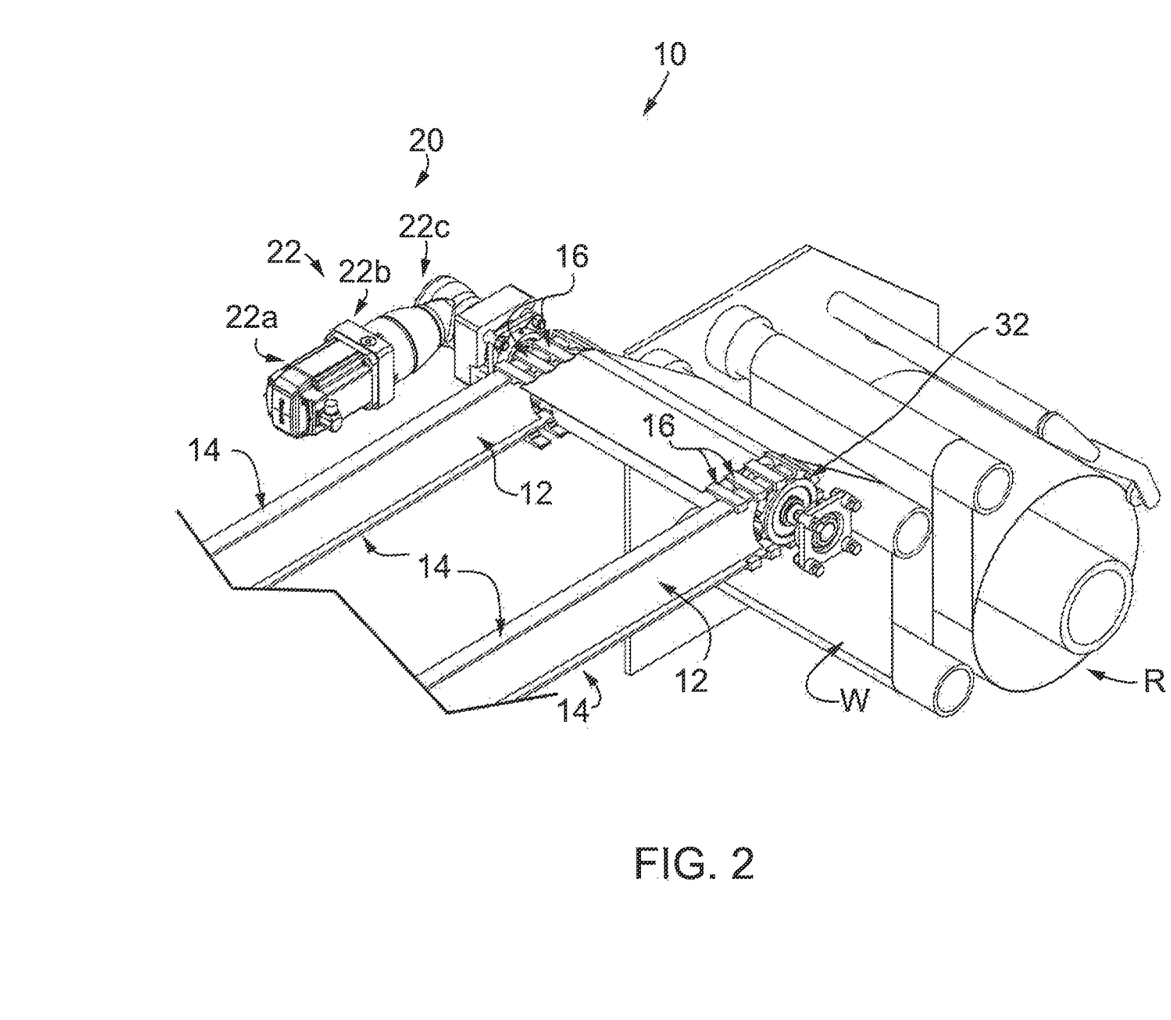
FIG. 2 is a partial isometric view of a portion of the web material advancement arrangement of FIG. 1 from an opposite angle relative to the partial isometric view illustrated in FIG. 1.
Figure 3:
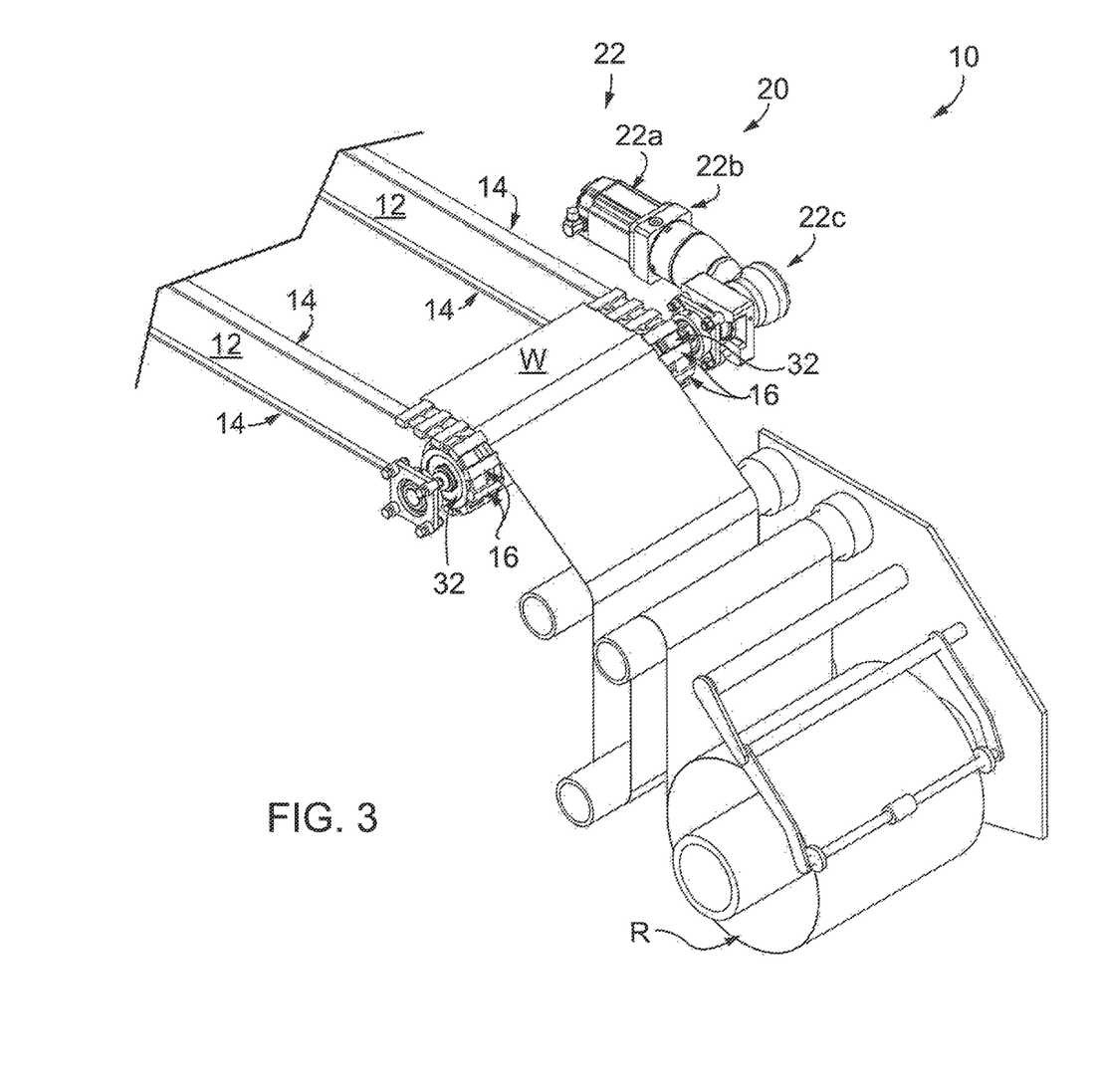
FIG. 3 is an enlarged partial isometric view of a portion of the web material advancement arrangement of FIG. 1.

As shown in FIGS. 1-3, a web material advancement arrangement for moving web material, shown at web W, through a machine is generally shown at 10. In a manner as is known, the web W may be supplied from storage on a roll R that is rotatably supported by the frame of the machine (not shown). In addition, the frame of the machine supports a pair of spaced-apart rails 12 of the web material advancement arrangement 10, which in turn supports a web material engagement arrangement. In a manner as is known, the web material engagement arrangement may be in the form of spaced-apart endless chains or belts, such as belts 14, that are equipped with web material gripper mechanisms, such as clip assemblies 16, that engage the web W adjacent opposite edges of the web W. Representatively, the web material engagement arrangement with belts 14 and clip assemblies 16 may be a clip belt-type web material engagement arrangement such as is shown and described in Buchko et al. U.S. Pat. No. 7,934,362 titled Belt Driven Clamping Arrangement for Gripping and Advancing Web Material in a Packaging Machine, the entirety of which is hereby incorporated by reference. It is understood, however, that the web material engagement arrangement may have any other satisfactory configuration and construction as desired, and which is capable of selectively engaging web material adjacent its edges at an upstream end, advancing the web material, and then releasing engagement of the web material at a downstream end. In the illustrated embodiment, the clip assemblies 16 are arranged as a series of web-engaging clip assemblies 16 that are secured to each belt 14 along the length of the belt 14. The drawings illustrate only a few of the clip assemblies 16 in the vicinity of the upstream end of the machine or entry end of the web material advancement arrangement, but it is understood that the clip assemblies 16 are secured along the entire length of each belt 14. In a manner as is known, each clip assembly 16 is selectively opened at the upstream end of the machine and then closed onto the web W so that the web W is engaged by each clip assembly 16 adjacent the edge of the web W.

As also shown in FIG. 1, the web material advancement arrangement 10 further includes a drive system such as an entry drive system, shown generally at 20, which is located at the upstream or entrance end of the machine that defines an entry end of the web material advancement arrangement. The web material advancement arrangement 10 acts on the web material engagement arrangement, namely belts 14 and clip assemblies 16, for imparting upstream-to-downstream motion to the upper runs of the belts 14 for advancing the web W through the machine.

The entry drive system 20 may define a direct drive system (FIGS. 1-8) or an indirect drive system (FIG. 9), explained in greater detail elsewhere herein. Regardless of whether the entry drive system 20 is configured as a direct or an indirect drive system, it is configured to push the web W (FIGS. 1-3) in a downstream direction from the upstream or entry end toward a downstream or exit end of the web material advancement arrangement 10, from which the web W travels farther downstream in the machine for processing.

Figure 6:
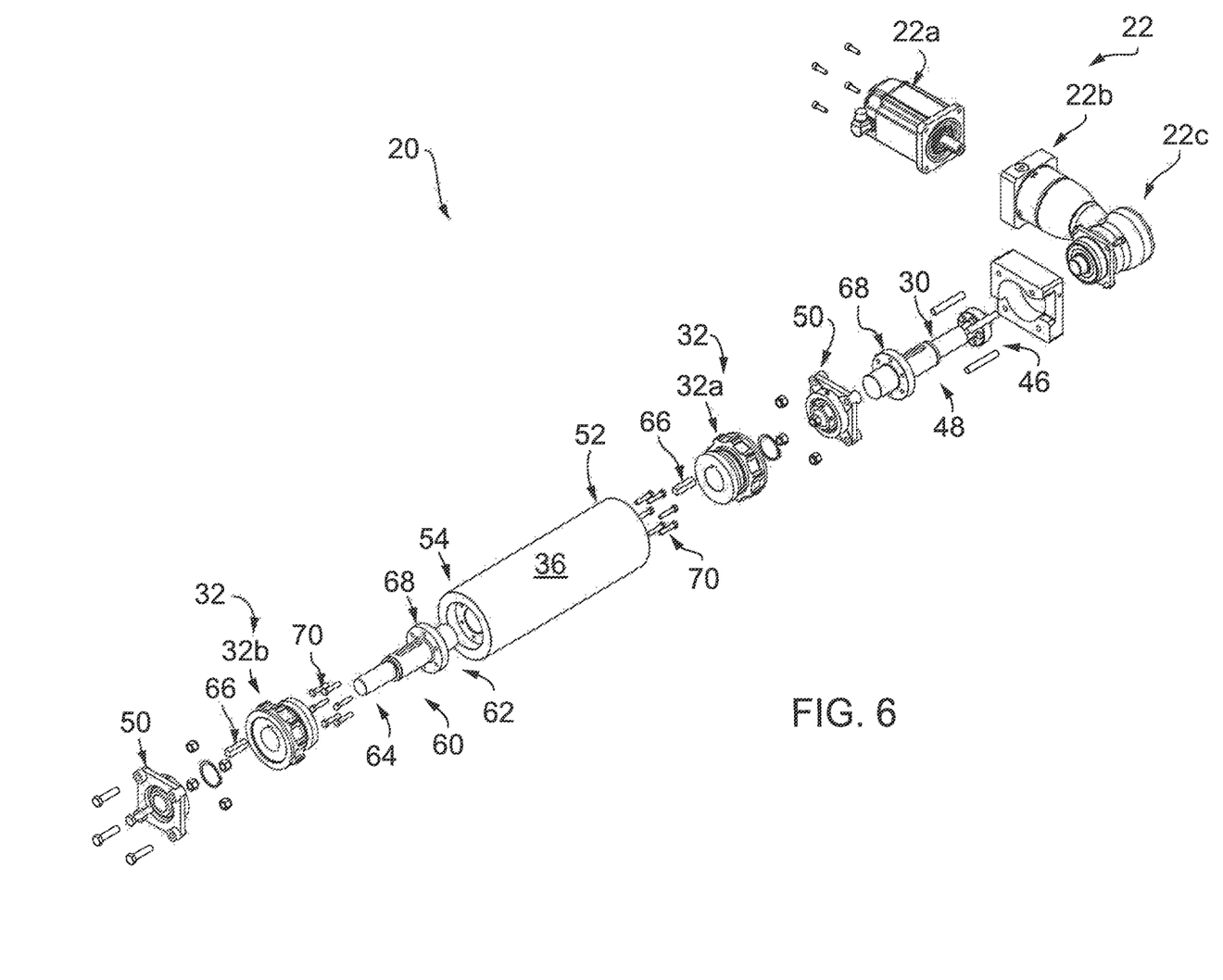
FIG. 6 is an exploded isometric view of the components of the entry drive system of FIG. 4.

Referring now to FIG. 1, generally, the drive system 20 includes a drive assembly 22 that is supported by the frame of the machine (not shown). Drive assembly 22 is shown with a single electric motor 22a as a prime mover that can deliver power for the entry drive system 20. Motor 22a is shown here generally parallel to the frame rail(s) 12 and delivers power to a gearbox 22b that may convert a rotational speed of a motor output shaft (not labeled) to an appropriate speed for operating downstream components within the power path of the entry drive system 20. Gearbox 22b is shown here with a 90-degree gearbox section 22c that may include a worm gear set or bevel gear set to change the direction of power application from a motor output shaft 22d (FIG. 6). Gearbox 22b is configured to directly deliver power from motor 22a to input shaft 30. Although gearbox 22b is shown with a 90-degree gearbox section 22c, it is understood that power transmission be achieved in other suitable ways, such as an inline gearbox or by way of a direct coupling to a motor.

Referring now to FIGS. 1-3, a pair of rotatable drive members, shown here as spaced-apart belt drive sprockets 32, is secured to the input shaft 30 and is configured to engage the belt 14 and clip assemblies 16 for moving the belt 14 and clip assemblies 16 in an upstream-to-downstream direction in response to operation of the drive assembly 22. At the exit end of web material advancement arrangement 10, a pair of spaced-apart idler sprockets may be connected to each other with an idler roller to support the web W. Such idler sprockets may have configurations and constructions similar to drive sprockets 32 and may be supported by the frame of the machine at its downstream or exit end in generally the same manner as the drive sprockets 32 are supported at the upstream or entry end. In a manner as is known, the belts 14, with clip assemblies 16, are carried about the idler sprockets to provide the continuous loop forming the upper and lower runs of the belts 14.

Figure 4:
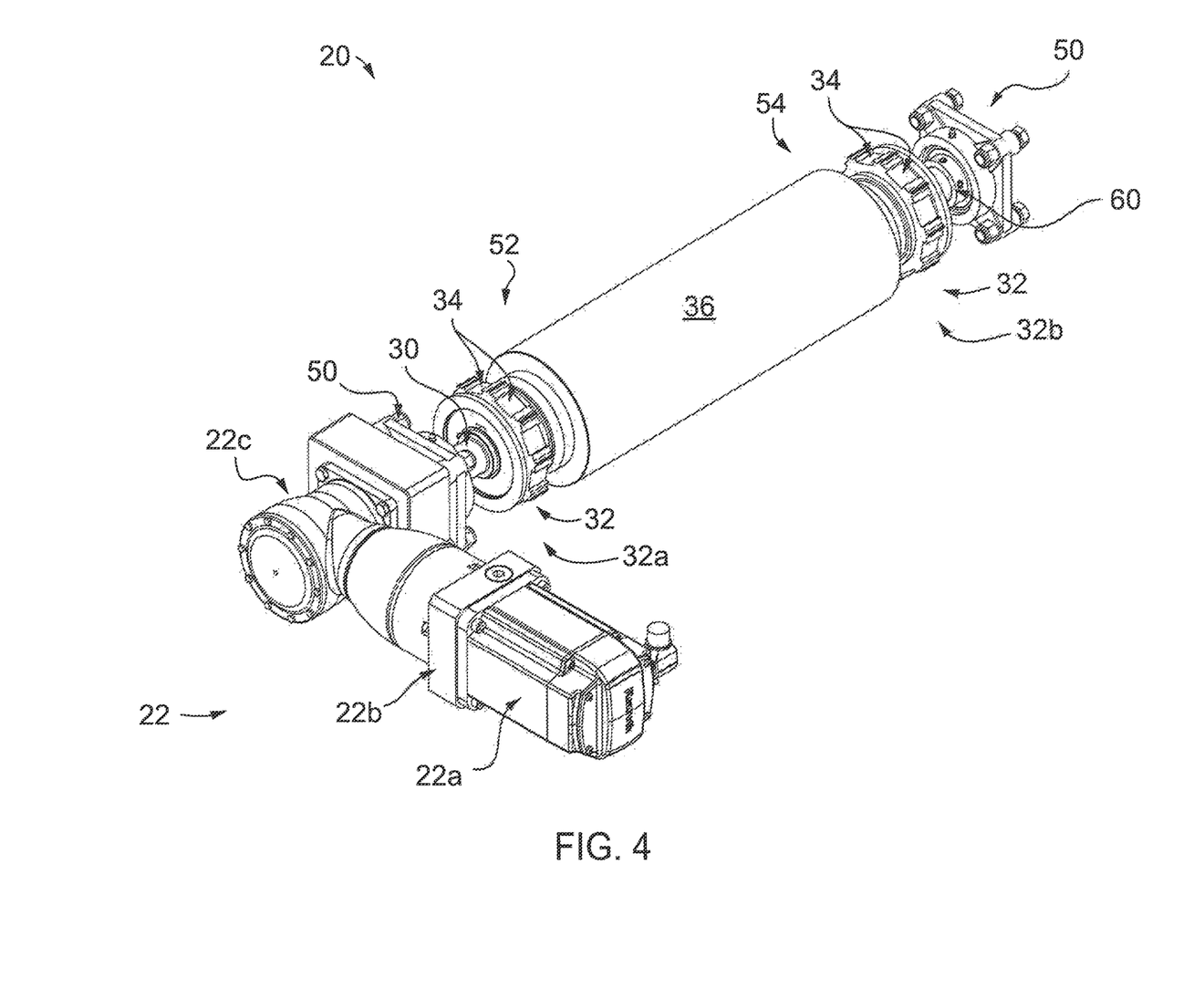
FIG. 4 is an isometric view of various components of the entry drive system according to an embodiment of the invention, separate from the rest of the web material advancement arrangement.
Figure 5:
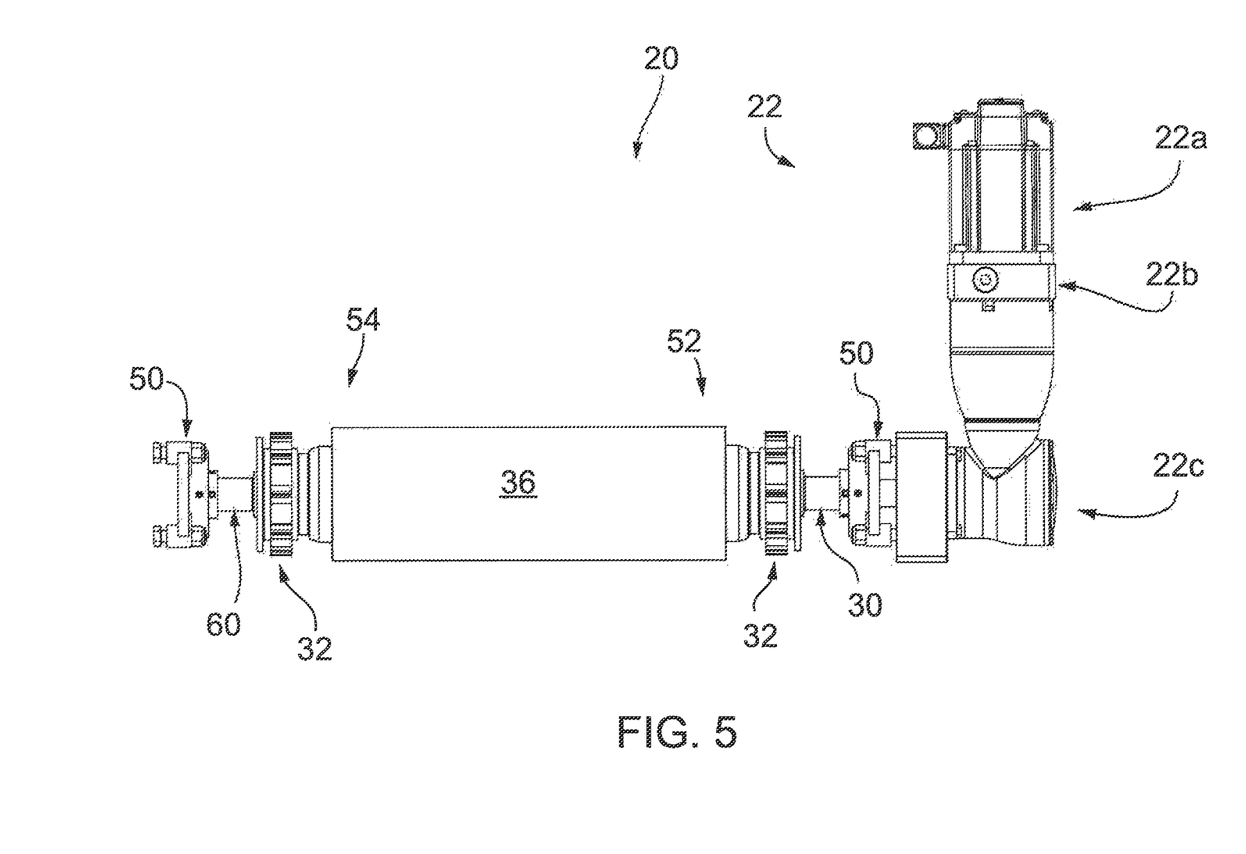
FIG. 5 is a top plan view of the components of the entry drive system of FIG. 4.

FIGS. 4-6 illustrate a direct drive system version of the drive system 20 separate from the machine and the web W. In the view provided in FIG. 4, it can be appreciated that each drive sprocket 32 includes a series of spaced recesses 34 about its outer periphery, each of which is configured to receive one of the clip assemblies 16. The belt 14 is engaged by the areas of each sprocket 32 on either side of each recess 34. Referring again to FIGS. 4-6, as can also be appreciated, the input shaft 30 is secured to a drive roller shown as roller 36 that is located between the sprockets 32. Sprockets 32 are mounted to ends of drive roller 36, with drive roller 36 defining a common shaft that locks the drive sprockets 32 into rotational unison with each other as driven by input shaft 30. The drive roller 36 is configured to support the web W between the edges of the web W that are engaged by the clip assemblies 16 at the upstream end of the machine or entry end of the web material advancement arrangement 10 and defines drive roller axis of rotation, indicated by the dashed line 38 (FIG. 1). The drive roller axis of rotation 38 is perpendicular to a motor axis of rotation, indicated by the dashed line 40 (FIG. 1).

Figure 7:
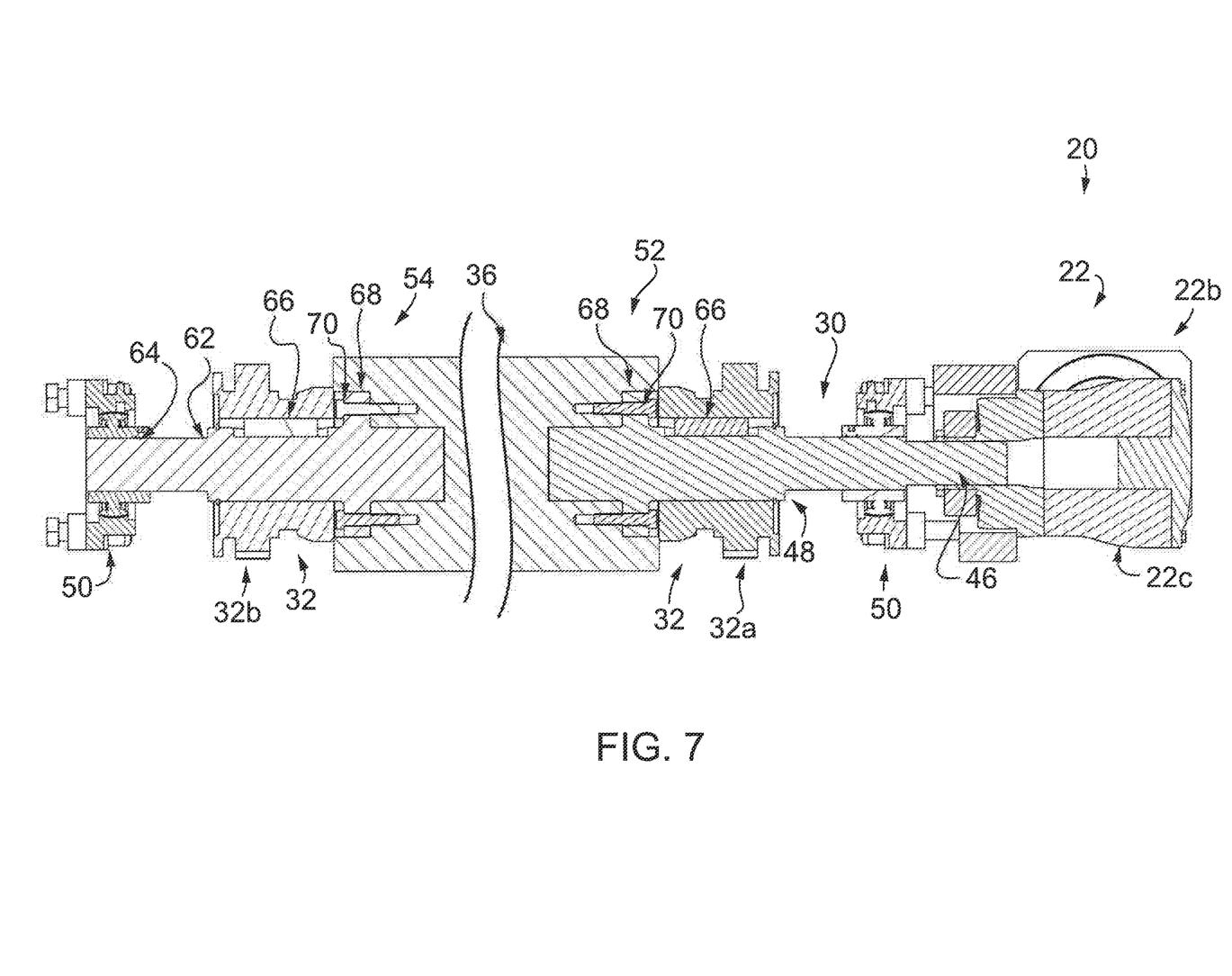
FIG. 7 is cross-sectional view of the various components of the entry drive system of FIG. 4.

Referring now to FIGS. 6-7, a squeeze collar 46 may provide a force on a bore of the gearbox and the input shaft 30 may define an input shaft inner portion 48 that is shown here supported by bearing assembly 50, which may be a pillow block bearing or other suitable bearing. It is understood that the squeeze collar 46 and/or torque transmitting components that deliver power to drive sprocket 32 may have other configurations, such as a resilient or other couplings) to accommodate misalignment of, for example, rotating components in driving and driven relationship with each other. Regardless, drive sprocket 32, which is closest to drive assembly 22, defines a first drive sprocket 32a that is mounted to the input shaft inner portion 48 to lock the first drive sprocket 32a and the input shaft 30 into rotational unison with each other. The drive roller 36 defines first and second ends 52, 54 with the first end 52 mounted to the input shaft inner portion 48 to lock the drive roller 36 and the input shaft 30 into rotational unison with each other. A support shaft 60 extends from and supports the second end 54 of drive roller 36. Support shaft 60 includes support shaft inner and outer portions 62, 64. The support shaft inner portion 62 is mounted to the drive roller's second end 54 to lock the support shaft 60 and the drive roller 36 in rotational unison with each other. Drive sprocket 32, which is farthest from drive assembly 22, defines a second drive sprocket 32b that is mounted to the support shaft inner portion 62 to lock the second drive sprocket 32b and support shaft 60 into rotational unison with each other. Support shaft outer portion 64 is supported by another bearing assembly 50.

Figure 8:
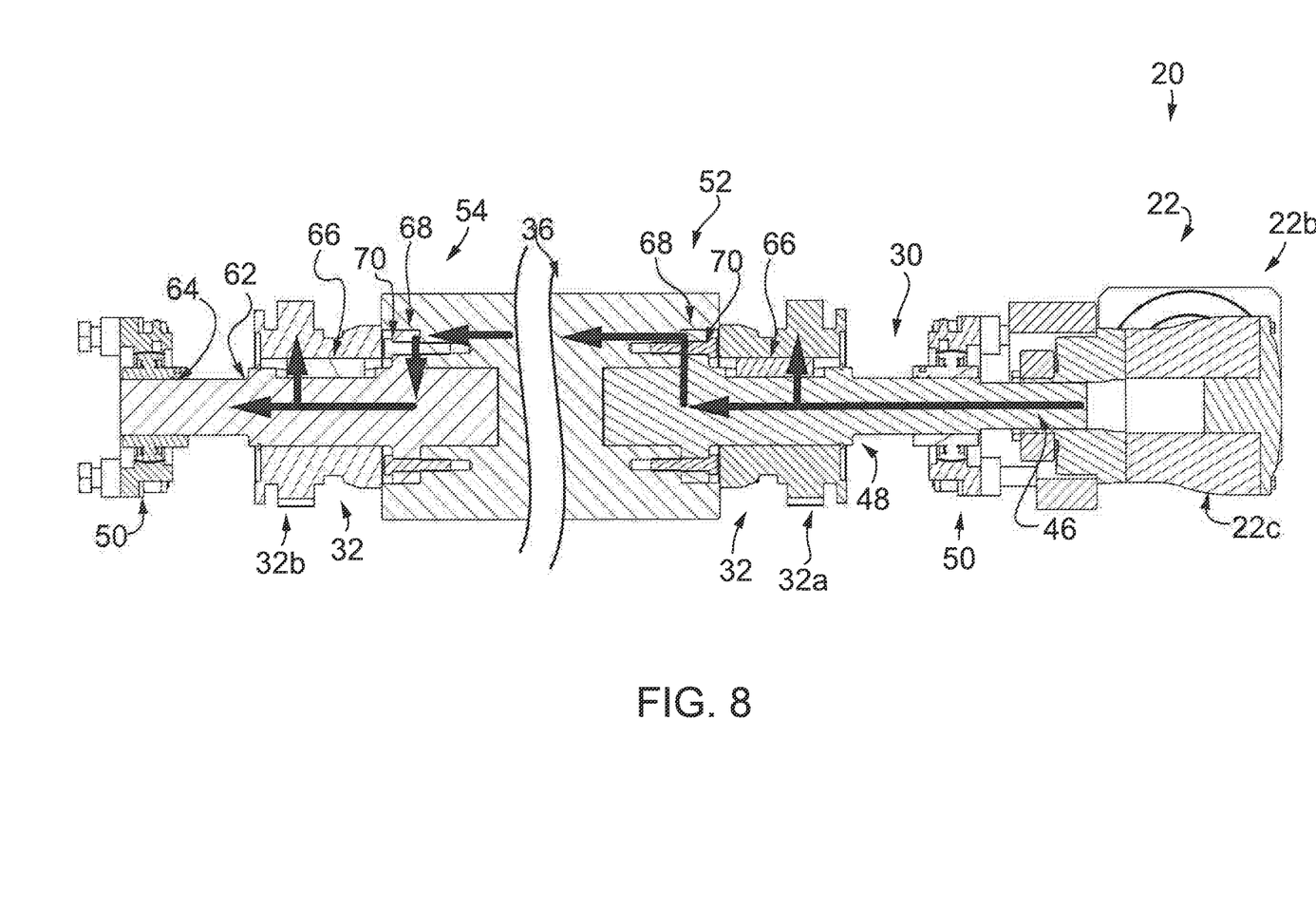
FIG. 8 is another cross-sectional view of the various components of the entry drive system of FIG. 4, showing a schematic representation of a power flow path through the various components.

Referring now to FIG. 8, a power flow path is schematically shown through drive system 20 components as represented with heavy-line arrows. The power flow path corresponds to torque transmission through the various components for pushing web material W (FIG. 1) in a downstream direction toward the exit end of web material advancement arrangement 10. Input shaft 30 receives torque or power at its input shaft inner portion 48 from motor 22a through gearbox 22b. The power is transmitted through input shaft 30 to its input shaft inner portion 48. At the input shaft inner portion 48, power is transmitted to the first drive sprocket 32a through a key 66 with a keyway fit and to the drive roller first end 52 through a flange 68 and fasteners 70 that secure the flange 68 against a shoulder or land within a counterbore of the drive roller first end 52. Power is transmitted through the drive roller 36 to its second end 54. At the drive roller second end 54, power is transmitted through flange 68 of the support shaft inner portion 62 and fasteners 70 that secure the flange 68 against a shoulder or land within a counterbore of the drive roller second end 54. At the support shaft inner portion 62, power is transmitted to the second drive sprocket 32b through a key 66 with a keyway fit. This results in unit-like simultaneous rotation of the first and second drive sprockets 32a, 32b through a single power input of input shaft 30 from a single motor 22a to push the web material W (FIG. 1) in a downstream direction toward the exit end of web material advancement arrangement 10.

Figure 9:
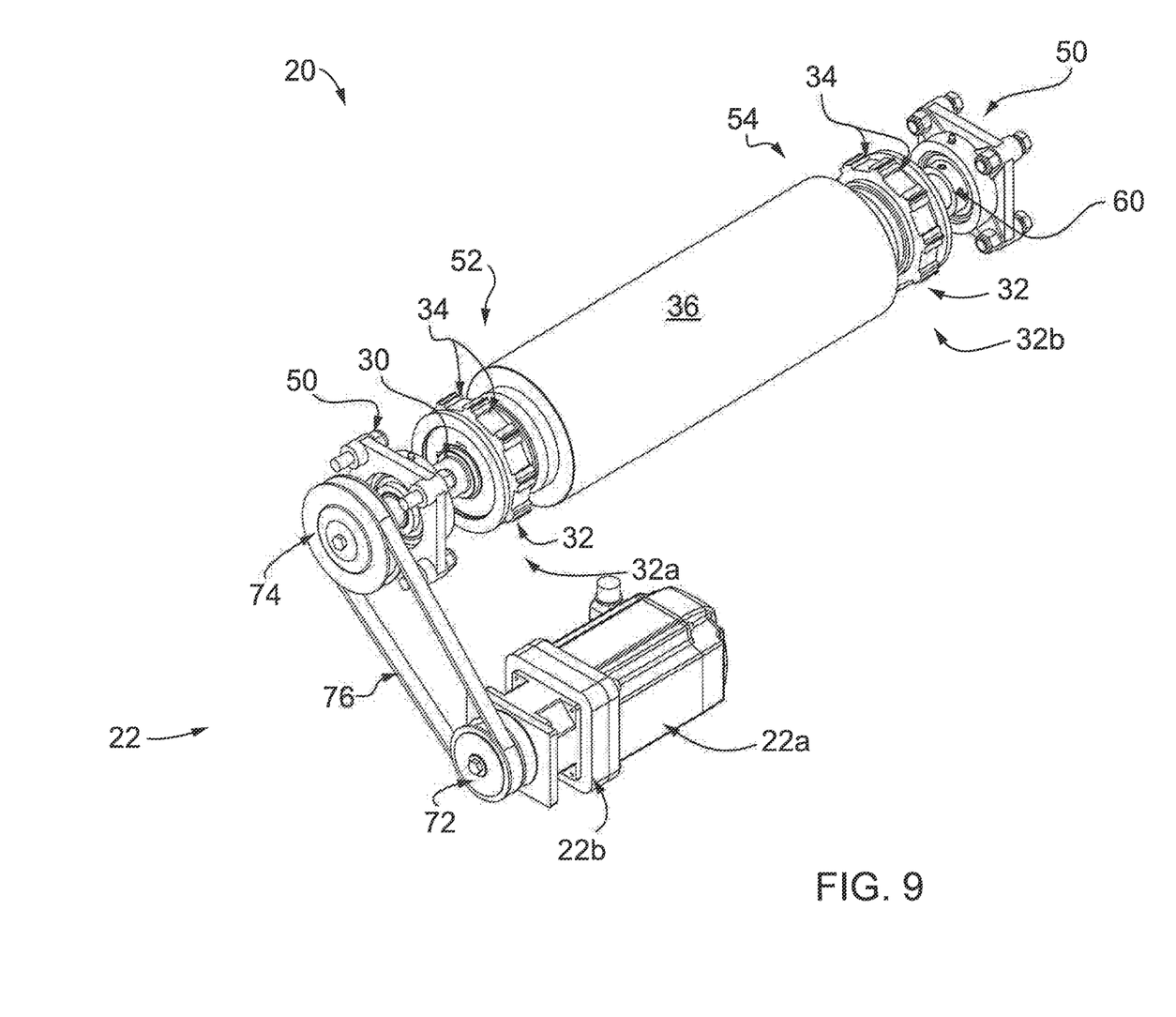
FIG. 9 is an isometric view of various components of a variant of the entry drive system of FIG. 4.

FIG. 9 illustrate an indirect drive system version of the drive system 20, showing the drive system 20 separate from the machine and the web W. This indirect drive system 20 of FIG. 9 is substantially similar to the direct drive system 20, shown in a similar view in FIG. 4, only differing in that the drive system 20 does not directly drive input shaft 30, but instead uses discrete spaced apart intervening components between gearbox 22b and input shaft 30. As shown in FIG. 9, gearbox 22b delivers power to a drive member, shown as drive pulley 72, which is driven during operation of the drive assembly 22. A driven member, shown as driven pulley 74, is rotated by a flexible drive member such as belt 76 that drivingly engages drive pulley 72 and driven pulley 74. Although in the illustrated embodiment the drive and driven members are in the form of drive and driven pulleys 72, 74 and the flexible drive member is in the form of belt 76, it is understood that any other type of drive system, such as but not limited to a sprocket-and-chain system, may be employed.

In operation, the web W is advanced in an upstream-to-downstream direction by operation of the single motor drive assembly 22, which imparts rotation to the input shaft 30 and thereby to the sprockets 32. In the direct drive system versions of entry drive system 20, like that shown in FIG. 1, motor 22a and gearbox 22b directly rotate the input shaft 30, which rotates the drive sprocket 32 nearest the gearbox 22b, the drive roller 36, and the drive sprocket 32 farthest from the gearbox 22b as a unit. In the indirect drive system versions of entry drive system 20, like that shown in FIG. 9, motor 22a and gearbox 22b rotate the drive pulley 72 which rotates the driven pulley 74 through belt 76. Rotation of pulley 74 rotates input shaft 30 and the drive sprocket 32 that is mounted to an end of input shaft 30 that is closest to the drive assembly 22, which also rotates the drive roller 36 and the drive sprocket 32 that is mounted farthest from the drive assembly 22. In this way, in both direct and indirect drive system versions of entry drive system 20, activating the entry drive system 20 pushes the web W in the upstream-to-downstream direction by rotation of the drive sprockets 32 at the entry end of web material advancement arrangement 10 that pushes and advances the belts 14 and clip assemblies 16 that carry the web W.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

We claim:

1. A web material advancement arrangement for a packaging machine, wherein the packaging machine defines an upstream end and a downstream end and wherein a storage roll of web material is spaced in an upstream direction from the upstream end of the packaging machine, comprising:
   a pair of spaced apart web advancement members, wherein the web advancement members extend in a downstream direction from the upstream end of the packaging machine;
   a web engagement arrangement associated with each of the spaced apart web advancement members, wherein each web engagement arrangement is configured to engage one of a pair of edges defined by the web material such that the web material is positioned between the pair of spaced apart web advancement members, wherein the web material is fed from the storage roll and comes into engagement with the web engagement arrangement of each web advancement member at the upstream end of the packaging machine; and
   a rotatable drive arrangement at the upstream end of the packaging machine, wherein the rotatable drive arrangement comprises a pair of rotatable drive members that define the upstream end of the packaging machine at which the web material comes into engagement with the web engagement arrangement of each web advancement member, wherein each of the rotatable drive members is engaged with one of the pair of spaced apart web advancement members at the upstream end of the packaging machine, and wherein operation of the rotatable drive arrangement and rotation of the rotatable drive members moves the pair of spaced apart web advancement members in an upstream-to-downstream direction and advances the web material therewith in the upstream-to-downstream direction.

2. The web material advancement arrangement of claim 1, wherein the pair of rotatable drive members are arranged in rotational unison with each other.

3. The web material advancement arrangement of claim 2, wherein the pair of rotatable drive members are defined by a pair of drive sprockets.

4. A web material advancement arrangement for a packaging machine, wherein the packaging machine defines an upstream end and a downstream end and wherein a storage roll of web material is located toward the upstream end of the packaging machine, comprising:
   a pair of spaced apart web advancement members wherein the web advancement members extend in a downstream direction from the upstream end of the packaging machine;
   a web engagement arrangement associated with each of the spaced apart web advancement member, wherein each web engagement arrangement is configured to engage one of a pair of edges defined by the web material such that the web material is positioned between the pair of spaced apart web advancement members; and
   a rotatable drive arrangement at the upstream end of the packaging machine, wherein ratable drive arrangement comprises a pair of ratable drive members that define the upstream end of the packaging machine, wherein each of the rotatable drive member is engaged with one of the pair of spaced apart web advancement members at the upstream end of the packaging machine, and wherein operation of the rotatable drive arrangement and rotation of the rotatable drive members moves the pair of spaced apart web advancement members in an upstream-to-downstream direction and advances the web material therewith in the upstream-to-downstream direction wherein the pair of rotatable drive members are arranged in rotational unison with each other, and wherein the pair of rotatable drive members are defined by a pair of drive sprockets that are mounted to a drive roller and wherein the drive roller locks the pair of drive sprockets into rotational unison with each other.

5. The web material advancement arrangement of claim 4, wherein the rotatable drive arrangement includes:
   a motor; and
   a gearbox that receives power from the motor and delivers power to the pair of sprockets and the drive roller to push the web material in the downstream direction from the upstream end of the packaging machine.

6. The web material advancement arrangement of claim 5, further comprising a pair of idler sprockets and an idler roller engaged with the pair of spaced apart web advancement members at a location downstream of the rotatable drive arrangement.

7. The web material advancement arrangement of claim 5, wherein the drive roller defines a drive roller axis of rotation, and wherein the motor includes a motor output shaft that defines a motor output shaft axis of rotation that is perpendicular to the drive roller axis of rotation.

8. The web material advancement arrangement of claim 7, wherein the gearbox directly drives an input shaft that is mounted to the drive roller.

9. The web material advancement arrangement of claim 8, wherein the motor is the only prime mover delivering power to the rotatable drive arrangement for moving the web material.

10. The web material advancement arrangement of claim 9, further comprising a pair of spaced-apart rails that extend downstream from the upstream end of the packaging machine and wherein the motor is arranged generally parallel to the pair of spaced-apart rails.

11. A web material advancement arrangement for a packaging machine, wherein the packaging machine defines an upstream end and a downstream end and wherein a storage roll of web material is located toward the upstream end of the packaging machine, comprising:
- a pair of spaced apart web members, wherein the web advancement members extend in a downstream direction from the upstream end of the packaging machine;
- a web engagement arrangement associated with each of the spaced apart web advancement members, wherein each web engagement arrangement is configured to engage one of a pair of edges define by the web material such that the web material is positioned between the pair of spaced apart web advancement members; and
- a rotatable drive arrangement at the upstream end of the packaging machine wherein the rotatable drive arrangement comprises a pair of rotatable drive members that define the upstream end of the packaging machine, wherein each of the rotatable drive members is engaged with one of the pair of spaced apart web advancement members at the upstream end of the packaging machine, and wherein operation of the rotatable drive arrangement and rotation of the rotatable drive members moves the pair of spaced apart web advancement members in an upstream-to-downstream direction and advances the web material therewith in the upstream-to-downstream direction, wherein the rotatable drive system further comprises:
- a motor configured to deliver power to the rotatable drive members;
- an input shaft arranged to receive power from the motor, wherein the input shaft has an input shaft outer portion that receives power from the motor and an opposite input shaft inner portion;
- wherein a first one of the rotatable drive members is mounted to the input shaft inner portion to lock the first rotatable drive member and the input shaft into rotational unison with each other;
- a drive roller having first and second ends, wherein the first end is mounted to the input shaft inner portion to lock the drive roller and the input shaft into rotational unison with each other;
- a support shaft having a support shaft inner portion and a support shaft outer portion, wherein the support shaft inner portion is mounted to the second end of the drive roller to lock the support shaft and the drive roller in rotational unison with each other;
- wherein a second one of the rotatable drive members is mounted to the support shaft inner portion to lock the second rotatable drive member and the support shaft into rotational unison with each other; and
- wherein a power flow path is defined that transfers torque:
  from the input shaft inner portion to the first rotatable drive member and the first end of the drive roller;
  from the second end of the drive roller to the support shaft inner portion; and
  from the support shaft inner portion to the second rotatable drive member.

12. A web material advancement arrangement for a packaging machine, wherein the packaging machine defines an upstream end and a downstream end and wherein a storage roll of web material is spaced in an upstream direction from the upstream end of the packaging machine, comprising:
- a pair of endless spaced-apart web engagement members, each of which is configured to engage the web adjacent one of a pair of opposite edges defined by the web, wherein the endless web engagement members extend in a downstream direction from the upstream end of the packaging machine, wherein the web material is fed from the storage roll and comes into engagement with the web engagement members at the upstream end of the packaging machine;
- a pair of rotatable drive members that are located at and that define the upstream end of the packaging machine, wherein each rotatable drive member is engaged with one of the endless web engagement members at the upstream end of the packaging machine at which the web material comes into engagement with the web engagement members; and
- a drive system for imparting rotation to the pair of rotatable drive members, wherein the drive system comprises a motor having an output, a rotatable input member to which each of the pair of rotatable drive members is secured, and a drive arrangement between the motor output and the rotatable input member, wherein operation of the motor causes rotation of the motor output and rotation of the pair of rotatable drive members through the drive arrangement so that the rotatable drive members are driven together in response to operation of the motor and move the pair of spaced apart web engagement members in the downstream direction and advance the web material therewith in the downstream direction.

13. The web material advancement arrangement of claim 12 wherein the rotatable drive members are secured to a common shaft.

14. The web material advancement arrangement of claim 13, wherein the drive arrangement comprises a drive member that is secured to the motor output, a driven member that is secured to the shaft, and a flexible drive member that is drivingly engaged with the drive member and the driven member so as to impart rotation to the driven member in response to rotation of the drive member caused by the motor output.

15. A web material advancement arrangement with an entry drive system that can receive a web material from a storage roll and advance the web material through a packaging machine, wherein the web material advancement arrangement comprises:
- an entry end that receives the web material from storage on the roll;
- an exit end that delivers the web material from the web material advancement arrangement downstream toward the rest of the packaging machine;
- an entry drive system arranged at the entry end of the web material advancement arrangement, wherein the entry drive system is configured to push the web material in a downstream direction from the entry end toward the exit end of the web material advancement arrangement; and a pair of rotatable drive sprockets arranged at the entry end of the web advancement arrangement, wherein the drive sprockets are mounted to a drive roller that locks the pair of drive sprockets into rotational unison with each other, wherein the web material advancement arrangement defines a pair of sides, and wherein the pair of rotatable drive sprockets are arranged in rotational unison with each other at the respective sides.

16. The web material advancement arrangement of claim 15, wherein the entry drive system includes;
a motor; and
a gearbox that receives power from the motor and delivers power to the pair of sprockets and the roller to push the web material in the downstream direction from the entry end toward the exit end of the web material advancement arrangement.

17. The web material advancement arrangement of claim 16, further comprising a pair of idler sprockets and an idler roller arranged at the exit end of the web material advancement arrangement.

18. The web material advancement arrangement of claim 16, wherein the drive roller defines a drive roller axis of rotation, and wherein the motor includes a motor output shaft that defines a motor output shaft axis of rotation that is perpendicular to the drive roller axis rotation.

19. The web material advancement arrangement of claim 18, wherein the gearbox directly drives an input shaft that is mounted to the drive roller.

20. The web material advancement arrangement of claim 19, wherein the motor is the only prime mover delivering power to the web material advancement arrangement for moving the web material.

21. The web material advancement arrangement of claim 20, further comprising a pair of spaced-apart rails that extend between the entry and exit ends of the web material advancement arrangement to support the web material and wherein the motor is arranged generally parallel to the pair of spaced-apart rails.

* * * * *

UNITED STATES PATENT AND TRADEMARK OFFICE
CERTIFICATE OF CORRECTION

PATENT NO. : 10,526,157 B2
APPLICATION NO. : 15/801566
DATED : January 7, 2020
INVENTOR(S) : Raymond G. Buchko, Jr. et al.

It is certified that error appears in the above-identified patent and that said Letters Patent is hereby corrected as shown below:

On the Title Page (56) References Cited: Please delete "5,632,729 A 11/1997 Buchko" and substitute therefor -- 5,682,729 A 11/1997 Buchko --;

In the Claims

Claim 4, Column 8, Line 21, after "members" insert -- , --;

Claim 4, Column 8, Line 26, delete "member" and substitute therefor -- members --;

Claim 4, Column 8, Line 33, delete "ratable" and substitute therefor -- the rotatable --;

Claim 4, Column 8, Line 34, delete "ratable" and substitute therefor -- rotatable --;

Claim 4, Column 8, Line 36, delete "member" and substitute therefor -- members --;

Claim 4, Column 8, Line 44, after "direction" insert -- , --;

Claim 11, Column 9, Line 24, delete "define" and substitute therefor -- defined --;

Claim 11, Column 9, Line 29, after "machine" insert -- , --.

Signed and Sealed this
Twenty-fifth Day of February, 2020

Andrei Iancu
*Director of the United States Patent and Trademark Office*